(12) United States Patent
Jones

(10) Patent No.: US 12,341,677 B2
(45) Date of Patent: Jun. 24, 2025

(54) ENERGY SAVINGS THROUGH AUTOMATIC ADJUSTMENT OF LINK SPEED

(71) Applicant: Cisco Technology, Inc., San Jose, CA (US)

(72) Inventor: Peter G. Jones, Gilroy, CA (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 18/302,511

(22) Filed: Apr. 18, 2023

(65) Prior Publication Data

US 2024/0356827 A1 Oct. 24, 2024

(51) Int. Cl.
*G06F 15/173* (2006.01)
*H04L 43/022* (2022.01)
*H04L 43/0888* (2022.01)

(52) U.S. Cl.
CPC ........ *H04L 43/0888* (2013.01); *H04L 43/022* (2013.01)

(58) Field of Classification Search
CPC .......................... H04L 43/0888; H04L 43/022
See application file for complete search history.

(56) References Cited

U.S. PATENT DOCUMENTS

| | | | | |
|---|---|---|---|---|
| 5,838,681 A * | 11/1998 | Bonomi | ................... | H04L 49/25 370/477 |
| 7,558,874 B1 * | 7/2009 | Kodukula | ........... | H04L 43/0894 713/320 |
| 8,839,013 B2 * | 9/2014 | Jenne | ..................... | G06F 1/3278 370/254 |
| 2002/0196736 A1 * | 12/2002 | Jin | .......................... | H04L 12/12 370/465 |
| 2003/0074464 A1 | 4/2003 | Bohrer et al. | | |
| 2003/0191854 A1 | 10/2003 | Hsu et al. | | |
| 2008/0239978 A1 | 10/2008 | Karam et al. | | |
| 2011/0199914 A1 * | 8/2011 | Agarwal | ............. | H04L 41/0681 370/252 |
| 2011/0249686 A1 | 10/2011 | Langner et al. | | |
| 2012/0188871 A1 * | 7/2012 | Liu | ......................... | H04L 43/16 370/230 |
| 2012/0221742 A1 | 8/2012 | Hsu | | |
| 2016/0091913 A1 | 3/2016 | Pani | | |
| 2017/0279666 A1 * | 9/2017 | Alshinnawi | ............. | H04L 43/08 |

* cited by examiner

*Primary Examiner* — Duyen M Doan
(74) *Attorney, Agent, or Firm* — Merchant & Gould P.C.

(57) ABSTRACT

Energy savings through adjustment of link speed may be provided. A utilization of a port may be monitored. The port may be configured to run at a plurality of speeds. Based on monitoring the utilization of the port, it may be determined that the utilization of the port has dropped, for a first predetermined time period, below a supported speed lower than a current port speed. Energy consumed by the port may be lowered, in response to determining that the utilization of the port has dropped, for the first predetermined time period, below a supported speed lower than the current port speed. Lowering the energy consumed by the port may comprise re-configuring the port to run at a second speed comprising a supported speed below the current speed. When the utilization of the port exceeds a predefined threshold over a second predetermined time period, the port speed may be increased.

19 Claims, 3 Drawing Sheets

ENERGY SAVINGS THROUGH AUTOMATIC ADJUSTMENT OF LINK SPEED

TECHNICAL FIELD

The present disclosure relates generally to providing energy savings through automatic adjustment of link speed.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
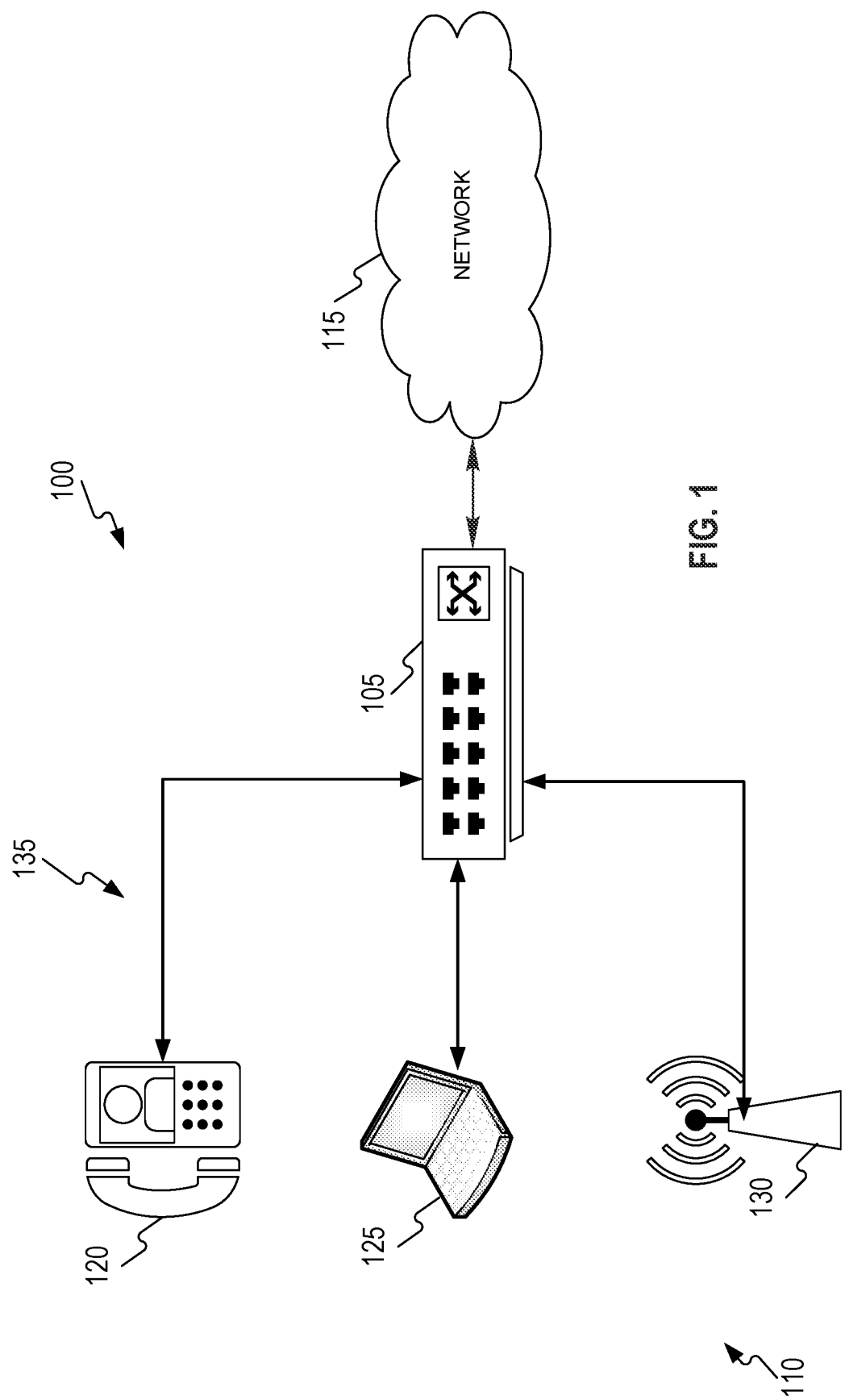
FIG. 1 is a block diagram of an operating environment for providing energy savings through automatic adjustment of link speed.

Energy savings through automatic adjustment of link speed may be provided. A utilization of a port may be monitored. The port may be configured to run at a plurality of speeds. Based on monitoring the utilization of the port, it may be determined that the utilization of the port has dropped, for a first predetermined time period, below a supported speed lower than a current port speed. Energy consumed by the port may be lowered, in response to determining that the utilization of the port has dropped, for the first predetermined time period, below a supported speed lower than the current port speed. Lowering the energy consumed by the port may comprise re-configuring the port to run at supported speed lower than the current port speed that is supported by both devices on the link.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Reducing the energy required to operate a network without significant impact to the users may help reduce carbon emissions in addition to the reduced cost of power. In an enterprise switching network, a significant amount of the energy may be consumed in the access layer switches. Accordingly, embodiments of the disclosure may reduce energy consumption by controlling the downlink speeds in the access layer switches of a network.

FIG. 1 shows an operating environment 100 for providing energy savings through automatic adjustment of link speed. As shown in FIG. 1, operating environment 100 may comprise a switch 105, a plurality of devices 110, and a network 115. Plurality of devices 110 may comprise a first device 120, a second device 125, and a third device 130. As illustrated by FIG. 1, for example, first device 120 may comprise a phone, second device 125 may comprise a computer, and third device 130 may comprise a wireless Access Point (AP). While FIG. 1 shows three devices, plurality of devices 110 may comprise any number of devices and is not limited to three.

Switch 105 may comprise an access switch. Access switches may comprise the network switches that connect the access layer. The network may be integrated with access devices like routers, Internet Protocol (IP) devices, control, and monitoring panels. An access layer of a hierarchy network may feature multiple layers to which the access switches may be directly connected. As illustrated by FIG. 1, switch 105 may connect plurality of devices 110 to network 115 and visa versa. A plurality of downlinks 135 may connect switch 105 with plurality of devices 110. The plurality of downlinks 135 may operate at a plurality of speeds. The plurality of speeds may comprise, but are not limited to 10 Mbit, 100 Mbit, 1 Gbit, 2.5 Gbit, 5 Gbit, and 10 Gbit. The speed at which a given link operates may be negotiated between a device and switch 105.

Switch 105 (e.g., an access switch) may have a few optical ports (e.g., 2-4 uplink ports connecting to network 115) and a number of downlink/BASE-T ports (e.g., 100-200 ports connecting to plurality of devices 110). As BASE-T ports may move to higher speeds (e.g., 2.5G/5G/10GBASE-T), the per port energy consumed by the BASE-T PHYs may grow significantly. The energy consumed depends on a number of elements, but the speed and the channel characteristics (e.g., cable type, length, deployment—bundled vs open tray) may comprise significant factors.

The elements described above of operating environment 100 (e.g., switch 105, first device 120, second device 125, and third device 130) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
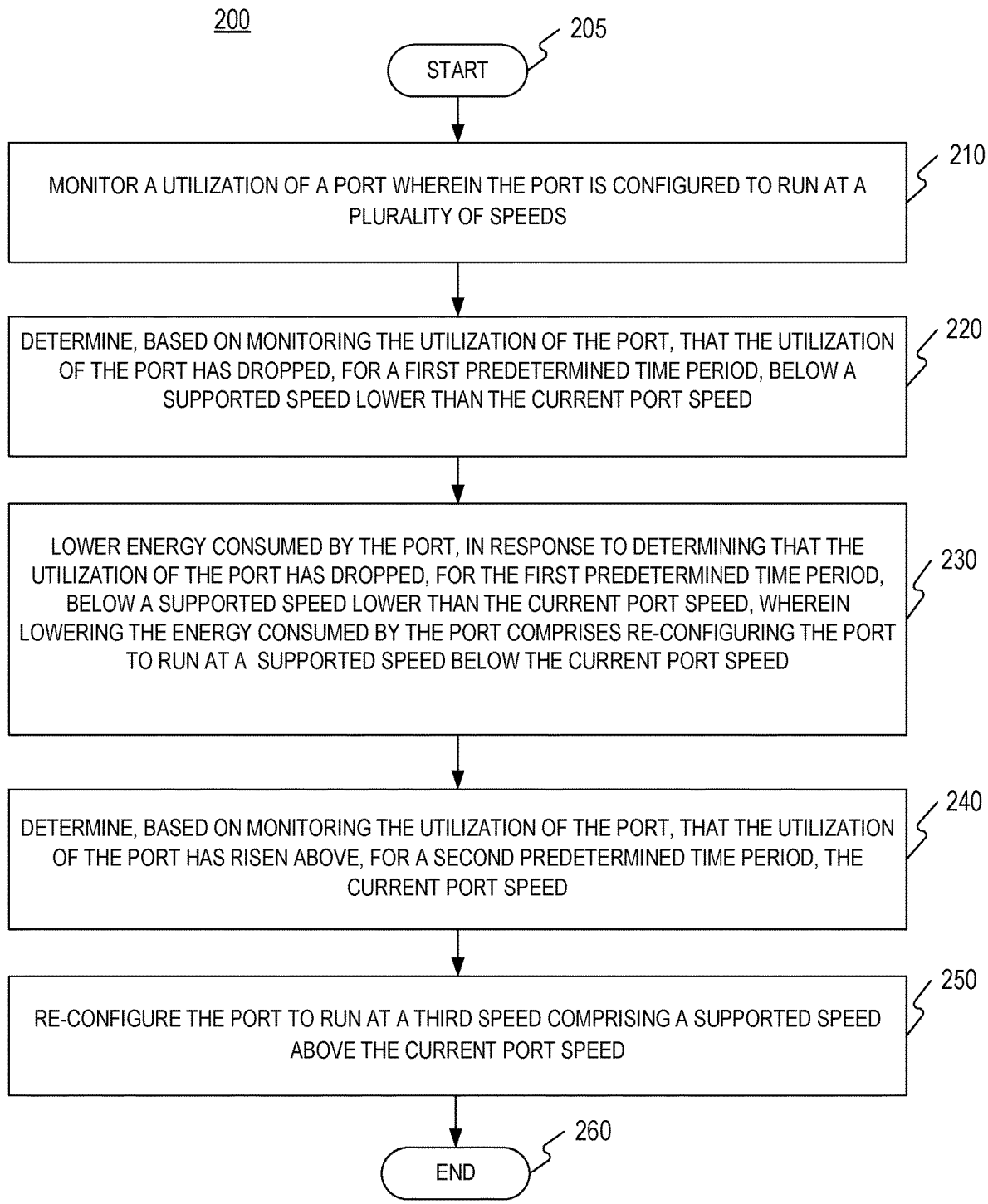
FIG. 2 is a flow chart of a method for providing energy savings through automatic adjustment of link speed.

FIG. 2 is a flow chart setting forth the general stages involved in a method 200 consistent with embodiments of the disclosure for providing energy savings through automatic adjustment of link speed. Method 200 may be implemented using a computing device disposed, for example, in switch 105 as described in more detail above with respect to FIG. 1. A computing device 300 is described in greater detail below with respect to FIG. 3. Ways to implement the stages of method 200 will be described in greater detail below.

Method 200 may begin at starting block 205 and proceed to stage 210 where switch 105 may monitor a utilization of a port. The port may be configured to run at a plurality of speeds. For example, while switch 105 and each of plurality of devices 110 may negotiate for a speed at which their respective link is configured to run at, the actual bandwidth utilization on a link may be different than the negotiated speed. Switch 105 may monitor the utilization on each port having a link connected to it to determine its bandwidth utilization. For example, the port may be configured to run any one of a plurality of different speeds comprising, but not limited to, 10 Mbit, 100 Mbit, 1 Gbit, 2.5 Gbit, 5 Gbit, and 10 Gbit.

From stage 210, where switch 105 monitors the utilization of the port, method 200 may advance to stage 220 where switch 105 may determine, based on monitoring the utilization of the port, that the utilization of the port has dropped, for a first predetermined time period, below a supported speed lower than a current port speed. For example, the first speed that the port is currently configured to run at may comprise 5 Gbit. Switch 105 may determine that the utilization of the port has dropped below 2.5 Gbit (e.g., below the speed of the next speed below the first speed). The first predetermined time period may comprise, but not limited to, 30 minutes. For example, a user of second device 125 may leave for lunch or for the day causing a corresponding drop in utilization on the link between second device 125 and switch 105.

Once switch 105 determines that the utilization of the port has dropped, for the first predetermined time period, below a supported speed lower than the current port speed in stage 220, method 200 may continue to stage 230 where switch 105 may lower energy consumed by the port, in response to determining that the utilization of the port has dropped, for the first predetermined time period below a supported speed lower than the current port speed. Lowering the energy consumed by the port may comprise re-configuring the port to run at a second speed comprising the next speed below the first speed. In the above example, the first speed that the port is currently configured to run at may comprise 5 Gbit. Switch 105 may determine that the utilization of the port has dropped below 2.5 Gbit. Accordingly, switch 105 may auto-negotiate with the link partner to re-configure the port to run at the second speed (i.e., 2.5 Gbit). This reduction in speed may save energy without causing any significant degradation in service once the new link speed is activated.

After switch 105 lowers energy consumed by the port in stage 230, method 200 may proceed to stage 240 where switch 105 may determine, based on monitoring the utilization of the port, that the utilization of the port has risen above, for a second predetermined time period, a threshold of the second speed. In the above example, the link between second device 125 and switch 105 may be reconfigured to run at 2.5 Gbit. For example, the threshold may comprise 80% and the second predetermined time period may comprise 5 minutes. Switch 105 may determine, based on monitoring the utilization of the port, that the utilization of the port has risen above, for 5 minutes, 80% of 2.5 Gbit.

In the above examples, the first predetermined time period may comprise 30 minutes and the second predetermined time period may comprise 5 minutes. Embodiments of the disclosure are not limited to these time period values and other values may be used. Consistent with embodiments of the disclosure, the second predetermined time period may be shorter than the first predetermined time period. In addition, the threshold may be used in conjunction with the second predetermined time period when deciding on whether to increase the speed. In this way embodiments of the disclosure may react more quickly to raise the speed and react less quickly to reduce the speed. Accordingly, embodiments of the disclosure may provide energy savings while minimizing the impact on performance.

Once switch 105 determines, based on monitoring the utilization of the port, that the utilization of the port has risen above, for the second predetermined time period, the second speed in stage 240, method 200 may continue to stage 250 where switch 105 may be re-configure the port to run at a third speed comprising the next speed above the second speed. For example, the second speed may comprise 2.5 Gbit and the next speed above the second speed may comprise 5 Gbit (e.g., the third speed). Accordingly, switch 105 may re-configure the port to run at 5 Gbit. Once switch 105 re-configures the port to run at the third speed comprising the next speed above the second speed in stage 250, method 200 may then end at stage 260.

Figure 3:
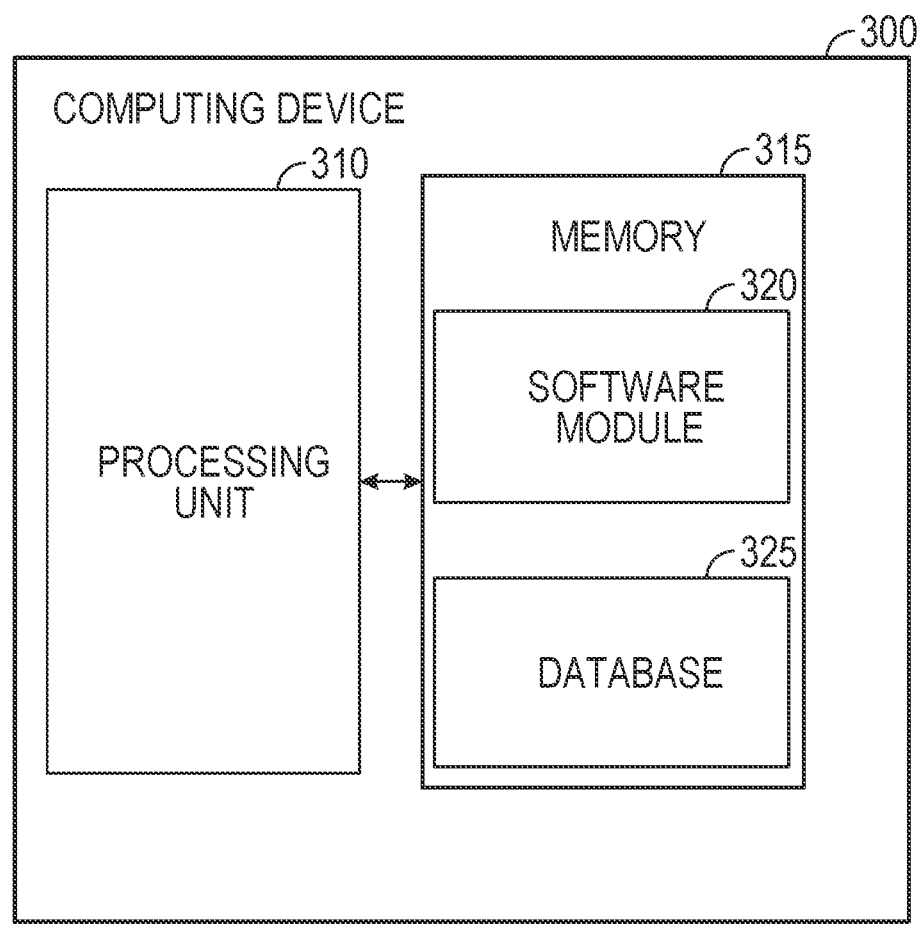
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing energy savings through automatic adjustment of link speed as described above with respect to FIG. 2. Computing device 300, for example, may provide an operating environment for switch 105, first device 120, second device 125, and third device 130. Switch 105, first device 120, second device 125, and third device 130 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   monitoring a utilization of a port, wherein the port is configured to run at a plurality of successive supported speeds;
   determining, based on monitoring the utilization of the port, that the utilization of the port has dropped, for a first predetermined time period, below a supported speed of the plurality of successive supported speeds that is lower than a current supported speed;
   lowering energy consumed by the port, in response to determining that the utilization of the port has dropped, for the first predetermined time period, below the supported speed that is lower than the current supported speed, wherein lowering the energy consumed by the port comprises re-configuring the port to run at a second supported speed of the plurality of supported speeds, and wherein the second supported speed is a next lower speed than the current supported speed in the plurality of successive supported speeds;
   determining, based on monitoring the utilization of the port, that the utilization of the port has risen above, for a second predetermined time period, a threshold of the second supported speed, wherein the second predetermined time period is shorter than the first predetermined period; and
   re-configuring, in response to determining that the utilization of the port has risen, for the second predetermined time period, above the threshold of the second supported speed, the port to run at a third supported speed that is above the second supported speed.

2. The method of claim 1, wherein the second predetermined time period comprises no more than 5 minutes.

3. The method of claim 1, wherein the plurality of supported successive speeds comprise at least three of 10 Mbit, 100 Mbit, 1 Gbit, 2.5 Gbit, 5 Gbit, and 10 Gbit.

4. The method of claim 1, wherein the first predetermined time period comprises no more than 30 minutes.

5. The method of claim 1, wherein the port is disposed in a network switch.

6. A system comprising:
a memory storage; and
a hardware processing unit coupled to the memory storage, wherein the processing unit is operative to:
monitor a utilization of a port, wherein the port is configured to run at a plurality of successive supported speeds;
determine, based on monitoring the utilization of the port, that the utilization of the port has dropped, for a first predetermined time period, below a supported speed of the plurality of successive supported speeds that is lower than a current supported speed;
lower energy consumed by the port, in response to determining that the utilization of the port has dropped, for the first predetermined time period, below the supported speed that is lower than the current supported speed, wherein the processing unit being operative to lower the energy consumed by the port comprises the processing unit being operative to re-configure the port to run at a second supported speed of the plurality of supported speeds, and wherein the second supported speed is a next lower speed than the current supported speed in the plurality of successive supported speeds;
determine, based on monitoring the utilization of the port, that the utilization of the port has risen above, for a second predetermined time period, a threshold of the second supported speed, wherein the second predetermined time period is shorter than the first predetermined period; and
re-configure, in response to determining that the utilization of the port has risen, for the second predetermined time period, above the threshold of the second supported speed, the port to run at a third supported speed that is above the second supported speed.

7. The system of claim 6, wherein the second predetermined time period comprises no more than 5 minutes.

8. The system of claim 6, wherein the plurality of successive supported speeds comprise at least three of 10 Mbit, 100 Mbit, 1 Gbit, 2.5 Gbit, 5 Gbit, and 10 Gbit.

9. The system of claim 6, wherein the first predetermined time period comprises no more than 30 minutes.

10. A non-transitory computer-readable medium that stores a set of instructions which when executed perform a method executed by the set of instructions comprising:
monitoring a utilization of a port wherein the port is configured to run at a plurality of successive supported speeds;
determining, based on monitoring the utilization of the port, that the utilization of the port has dropped, for a first predetermined time period, below a supported speed of the plurality of successive supported speeds that is lower than a current supported speed;
lowering energy consumed by the port, in response to determining that the utilization of the port has dropped, for the first predetermined time period, below the supported speed that is lower than the current supported speed, wherein lowering the energy consumed by the port comprises re-configuring the port to run at a second supported speed of the plurality of supported speeds, and wherein the second supported speed is a next lower speed than the current supported speed in the plurality of successive supported speeds;
determining, based on monitoring the utilization of the port, that the utilization of the port has risen above, for a second predetermined time period, a threshold of the second supported speed, wherein the second predetermined time period is shorter than the first predetermined period; and
re-configuring, in response to determining that the utilization of the port has risen, for the second predetermined time period, above the threshold of the second supported speed, the port to run at a third supported speed that is above the second supported speed.

11. The non-transitory computer-readable medium of claim 10, wherein the second predetermined time period comprises no more than 5 minutes.

12. The non-transitory computer-readable medium of claim 10, wherein the plurality of successive supported speeds comprise at least three of 10 Mbit, 100 Mbit, 1 Gbit, 2.5 Gbit, 5 Gbit, and 10 Gbit.

13. The non-transitory computer-readable medium of claim 10, wherein the first predetermined time period comprises no more than 30 minutes.

14. The non-transitory computer-readable medium of claim 10, wherein the port is disposed in a network switch.

15. The non-transitory computer-readable medium of claim 10, wherein the port is a downlink port.

16. The method of claim 1, wherein the port is a downlink port.

17. The system of claim 6, wherein the port is a downlink port.

18. The system of claim 6, wherein the port is disposed in a network switch.

19. The system of claim 6, wherein the port is disposed in a router.

* * * * *